United States Patent
Husain (10) Patent No.: US 10,410,111 B2
(45) Date of Patent: Sep. 10, 2019

(54) AUTOMATED EVALUATION OF NEURAL NETWORKS USING TRAINED CLASSIFIER

(71) Applicant: SparkCognition, Inc., Austin, TX (US)

(72) Inventor: Syed Mohammad Amir Husain, Georgetown, TX (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/793,866

(22) Filed: Oct. 25, 2017

(65) Prior Publication Data

US 2019/0122096 A1    Apr. 25, 2019

(51) Int. Cl.
*G06N 3/04*        (2006.01)
*G06F 11/34*       (2006.01)
*G06N 20/00*       (2019.01)

(52) U.S. Cl.
CPC ........... *G06N 3/04* (2013.01); *G06F 11/3447* (2013.01); *G06F 11/3495* (2013.01); *G06N 20/00* (2019.01)

(58) Field of Classification Search
CPC .......... G06N 99/005; G06N 3/08; G06N 3/04; G06F 17/30707; G06K 9/6269
USPC ........................................................ 706/20
See application file for complete search history.

(56) References Cited

U.S. PATENT DOCUMENTS

| | | | | |
|---|---|---|---|---|
| 5,636,326 | A * | 6/1997 | Stork | G01N 33/005 706/25 |
| 5,835,901 | A * | 11/1998 | Duvoisin, III | G06K 9/627 706/19 |
| 6,128,609 | A * | 10/2000 | Rose | G06N 3/08 706/23 |
| 7,293,002 | B2 * | 11/2007 | Starzyk | G06N 3/088 706/15 |
| 7,324,979 | B2 * | 1/2008 | Butler | G06K 9/00536 706/20 |
| 8,762,299 | B1 * | 6/2014 | Breckenridge | G06F 15/18 706/12 |
| 9,449,271 | B2 * | 9/2016 | Wang | G06N 3/02 |
| 9,559,918 | B2 * | 1/2017 | Di Pietro | H04L 63/1408 |
| 9,852,019 | B2 * | 12/2017 | Ashani | G06F 11/0706 |

(Continued)

OTHER PUBLICATIONS

Floreano, et al., "Neuroevolution: from architectures to learning," Review Article, 2008, Evol. Intel., vol. 1, Springer-Verlag, pp. 47-62.

(Continued)

*Primary Examiner* — Scott A. Waldron
*Assistant Examiner* — Viker A Lamardo
(74) *Attorney, Agent, or Firm* — Toler Law Group, PC (57) ABSTRACT

A computer system includes a memory storing a data structure representing a neural network. The data structure includes a plurality of fields including values representing topology of the neural network. The computer system also includes one or more processors configured to perform neural network classification by operations including generating a vector representing at least a portion of the neural network based on the data structure. The operations also include providing the vector as input to a trained classifier to generate a classification result associated with at least the portion of the neural network, where the classification result is indicative of expected performance or reliability of the neural network. The operations also include generating an output indicative of the classification result.

23 Claims, 3 Drawing Sheets

(56) References Cited

U.S. PATENT DOCUMENTS

| | | | | |
|---|---|---|---|---|
| 2004/0204930 A1* | 10/2004 | Chang | .................... | G10L 15/08 |
| | | | | 704/202 |
| 2007/0094168 A1* | 4/2007 | Ayala | .................... | G06N 3/105 |
| | | | | 706/15 |
| 2007/0097959 A1* | 5/2007 | Taylor | .................... | G06F 21/10 |
| | | | | 370/352 |
| 2015/0324690 A1* | 11/2015 | Chilimbi | ................ | G06N 3/063 |
| | | | | 706/25 |
| 2016/0155069 A1* | 6/2016 | Hoover | ................. | G06Q 30/06 |
| | | | | 706/12 |
| 2016/0364810 A1* | 12/2016 | Yang | .................... | G06N 99/005 |
| 2017/0308557 A1* | 10/2017 | Cassidy | ............ | G06F 17/30303 |

OTHER PUBLICATIONS

Denoeux, T., "A Neural Network Classifier Based on Dempster-Shafer Theory," IEEE Transactions on Systems, Man, and Cybernetics—Part A: Systems and Humans, vol. 30, No. 2, IEEE, Piscataway, NJ, Mar. 2000, pp. 131-150.

\* cited by examiner

AUTOMATED EVALUATION OF NEURAL NETWORKS USING TRAINED CLASSIFIER

BACKGROUND

Advances in machine learning have enabled computing devices to solve complex problems in many fields. For example, image analysis (e.g., face recognition), natural language processing, and many other fields have benefitted from the use of machine learning techniques.

In some machine learning techniques, supervised training data (e.g., data with a known characteristic, also referred to as a label) is provided as input to train a machine learning process to generate a data model. The data model may take one of many forms, such as a decision tree, a neural network, or a support vector machine. For example, to train or optimize a neural network using back propagation, data is provided as input to the neural network, and an output of the neural network is compared to a label associated with the data. A difference between the output of the neural network and the label is used to calculate an error function, which is used to modify the neural network (e.g., by changing link weights between nodes of the neural network) with a goal of decreasing the difference between the output of the neural network based on particular data and the label associated with the particular data. Accordingly, after the neural network is trained, the neural network may be expected to generate reliable results based on the supervised training data.

However, neural networks and other types of data models generally do not describe a human-understandable relationship between the input data and the output data. Stated another way, it is generally not clear, from a human perspective, why a neural network would be expected to produce a reliable result. Accordingly, there is sometimes concern about the reliability of machine learning data models, since a human viewing a machine learning data model may be unable to discern a pattern or logical reason why the data model generates a particular output based on a particular input.

SUMMARY

Systems and methods described herein provide a mechanism for evaluating a machine learning data model, such as a neural network, to determine whether the machine learning data model is expected to provide reliable results, whether the machine learning data model is expected to satisfy a performance criterion, or both. In this context, reliability refers generally to the ability of a neural network to generate accurate results. For example, reliability may be measured in terms of robustness of the neural network to a range of input values, ability of the neural network to generate a result that has a relatively small difference (e.g., less than a threshold) from an expected or known value, ability of the neural network to generate a confidence score or value that aligns with (e.g., are within a threshold of) an expected confidence value, and so forth. Also, in this context, performance refers generally to efficiency in terms of time or resources used to arrive at a result. For example, performance may be measured in terms a number of layers of the neural network, processing time of the neural network, capability of the neural network to be parallelized, and so forth. Performance may also encompass the concept of "correctness" of the results. As used herein, correctness refers to formal correctness of behavior of the neural network. For example, the correctness of a neural network indicates that the neural network satisfies a formal specification of its behavior.

In a particular implementation, a classifier is trained using supervised training data descriptive of a set of neural networks that have known reliability or other characteristics. For example, the supervised training data may include feature vectors or other data representing a first set of neural networks that are known (e.g., labeled) to have historically provided reliable results, and the supervised training data may include feature vectors or other data representing a second set of neural networks that are known (e.g., labeled) to have historically provided unreliable results. A classifier trained using such supervised training data may be configured to distinguish neural networks that are expected to provide reliable results from neural networks that are not expected to provide reliable results.

In some implementations, the supervised training data may also include feature vectors or other data representing neural networks that are labeled as having other features, such as neural networks that have not been trained using an optimization process, such as back propagation. Other examples of labels that may be associated with neural networks in the supervised training data include labels that indicate a type of data the neural network is configured to use. Such labels may enable the classifier to distinguish a neural network that is configured to analyze image data from a neural network that is configured to analyze textual data. Still other examples of labels that may be associated with neural networks in the supervised training data include labels indicating a type of result a neural network is configured to generate, such as a regression result, a classification result, or a reinforcement learning result.

In a particular implementation, each neural network represented in a training data set (e.g., the supervised training data) may be represented by a data structure that describes, for example, the topology of the neural network, activation functions used by the neural network, bias functions used by the neural network, link configurations, link weights, and so forth. The data structure of representing a neural network may be used to generate a vector representation of the neural network. For example, the vector representation of the neural network may include one or more fields representing each node of the neural network and one or more fields representing each link of the neural network. In other examples, other vectorization processes may be used, such as generating a vector including one or more fields representing each layer of the neural network.

The neural networks represented in the training data may have a different sizes or other different features that cause the vector representations of the neural networks to have different lengths (e.g., different numbers of fields). Accordingly, the supervised training data used to generate the classifier may use normalized vector representations of the neural networks. Each normalized vector may have the same length. In some implementations, a normalized vector of a neural network includes a set of values where each value represents the presence or absence of a particular feature in the vector representation of the neural network or in the data structure representing the neural network. For example, the normalized vector may be a Boolean vector in which a value of 1 represents the presence of a feature and a value of 0 represents the absence of the feature. Alternatively, the normalized vectors may include floating point values, integer values, or string values representing particular features. In some implementations, a normalized vector may represent only a portion of the corresponding neural network. For example, the normalized vector may represent only the topology of the neural network, only a subset of the layers of the neural network, only a subset of the nodes of the neural network, or only some other portion of the neural network.

The supervised training data (e.g., a set of data including, for each neural network of a training set, a vector representing the neural network and a corresponding label indicating a characteristic of the neural network) are used to generate a trained classifier. Based on the supervised training data, the trained classifier is configured to generate a classification result indicating a classification associated with an input data structure of an unknown (e.g., unlabeled) neural network. For example, when a data structure representing a neural network that has unknown reliability is provided, the data structure may be analyzed to generate a vector representation and a normalized vector representation of the neural network. The normalized vector representation may be provided as input to the trained classifier to generate a classification result. The classification result may indicate whether, for example, the unknown neural network is expected to provide reliable results, whether the unknown neural network is trained or untrained, whether the unknown neural network is a classifier or regression model, whether the unknown neural network is expected to satisfy a performance criterion, and so forth. In some implementations, further actions may be taken based on a classification result assigned to the neural network. For example, if the unknown neural network is classified as untrained, a signal may be sent to a classifier generation and training process to train the neural network, after which case the neural network may be reevaluated to determine whether it is expected to generate reliable results.

Thus, the trained classifier enables evaluation of a neural network to generate a classification result indicating, for example, an expected performance or reliability of the neural network, thus alleviating or decreasing concerns about whether an unknown neural network is reliable and performs adequately. Additionally, implementations described herein facilitate identifying neural networks that are not reliable, thus enabling regeneration, retraining, and so forth of the unreliable neural networks in order to produce more reliable neural networks. As a particular example, when a neural network is used in a production process, such as for predicting process or equipment failures or for generating natural language processing classifications, the neural network may be updated occasionally. After the neural network is updated, a user may be concerned as to whether the updated neural network is reliable. Accordingly, the updated neural network may be provided as input to the trained classifier in order to generate a classification result indicating whether the neural network is expected to be reliable or not.

As more neural networks are evaluated and the trained classifier is updated, reliability of classification results provided by the trained classifier should increase. Additionally, because the neural networks used to train the trained classifier can be derived from a broad range of categories, can analyze many different types of data, and can generate many different types of results, the trained classifier is able to provide classification results for an unknown neural network independently of the type of data the unknown neural network is configured to operate on and independent of a type of result the unknown neural network in configured to generate. Accordingly, the trained classifier provides a generic or broadly applicable tool to evaluate substantially any neural network to generate a classification result.

Additionally, the trained classifier may be used with other evaluation processes, such as heuristic rules to further improve user satisfaction or confidence in the classification result provided by the trained classifier. For example, the heuristic rules may identify particular patterns within the normalized vector representations of neural networks that are expected to be associated with unreliable results. To illustrate, a normalized vector that includes a plurality of fields that all have the same value (e.g., all ones or all zeros) may be expected to be unreliable. As another illustrative example, a normalized vector that includes a plurality of fields that have a repeating value may be expected to be unreliable. In some implementations, the heuristic rules may identify vector representations of neural networks that are expected to be associated with poor (e.g., unsatisfactory) performance. To illustrate, execution of a neural network that includes multiple recursive links or a large number (e.g., greater than a threshold number) of nodes may be too slow to satisfy a performance criterion.

The heuristic rules may be used during generation of the trained classifier or after generation of the trained classifier. For example, the heuristic rules may be applied during generation of the trained classifier to evaluate vectors in the supervised training data so that erroneous or suspected erroneous neural networks can be removed from the supervised training data. Alternatively or in addition, the heuristic rules may be applied after the trained classifier is generated to evaluate an unknown or unlabeled neural network.

In some implementations, one or more of the heuristic rules may compare a vector (e.g., a normalized vector) of a labeled neural network with a vector (e.g., a normalized vector) of an unknown neural network. For example, a heuristic rule may perform a distance evaluation to determine a distance (e.g., a Hamming distance) between the normalized vector of the labeled neural network and the normalized vector of the unknown neural network. In this example, if the distance between the normalized vectors is small (e.g., less than a threshold), a label associated with the labeled neural network may be assigned to the unknown neural network. To illustrate, if the distance between the normalized vector of the unknown neural network and a normalized vector of a known (e.g., labeled) unreliable neural network is very small, the heuristic rules may cause the unknown neural network to be labeled as unreliable based on the similarity to the known unreliable neural network (e.g., a neural network that is labeled unreliable in supervised training data).

In some implementations, evaluation using the heuristic rules is less resource intensive than evaluation using the trained classifier. Accordingly, in such implementations, the heuristic rules may be used to screen vectors before they are provided as input to the trained classifier. In these implementations, an unknown neural network that can be classified (e.g., labeled) using only the heuristic rules is not provided as input to the trained classifier in order to save processing resources and time associated with using the trained classifier. In other implementations, vectors of unknown neural networks are evaluated using both the heuristic rules and the trained classifier. In such implementations, the heuristic rules provide a secondary confirmation of a classification result provided by the trained classifier, thereby increasing user confidence in the classification result.

In a particular aspect, a computer system includes a memory storing a data structure representing a neural network. The data structure includes a plurality of fields including values representing topology of the neural network. The plurality of fields are descriptive of a first node of the neural network, a second node of the neural network, and a link between the first node and second node. The computer system also includes one or more processors configured to perform neural network classification by operations including generating a vector representing at least a portion of the neural network based on the data structure. The operations also include providing the vector as input to a trained classifier to generate a classification result associated with at least the portion of the neural network, where the classification result is indicative of expected performance or reliability of the neural network. The operations also include generating an output indicative of the classification result.

In another particular aspect, a method includes accessing, by a processor, a data structure representing a neural network. The data structure includes a plurality of fields including values representing topology of the neural network. The plurality of fields are descriptive of a first node of the neural network, a second node of the neural network, and a link between the first node and second node. The method also include generating, by the processor, a vector representing at least a portion of the neural network based on the data structure. The method further includes providing, by the processor, the vector as input to a trained classifier to generate a classification result associated with at least the portion of the neural network, where the classification result is indicative of expected performance or reliability of the neural network. The method also includes generating, by the processor, an output indicative of the classification result.

In another particular aspect, a computer-readable storage device stores instructions that, when executed, cause a computer to perform operations including accessing a data structure representing a neural network. The data structure includes a plurality of fields including values representing topology of the neural network. The plurality of fields are descriptive of a first node of the neural network, a second node of the neural network, and a link between the first node and second node. The operations also include generating a vector representing at least a portion of the neural network based on the data structure. The operations further include providing the vector as input to the trained classifier to generate a classification result associated with at least the portion of the neural network, where the classification result is indicative of expected performance or reliability of the neural network. The operations also include generating an output indicative of the classification result.

DETAILED DESCRIPTION

Figure 1:
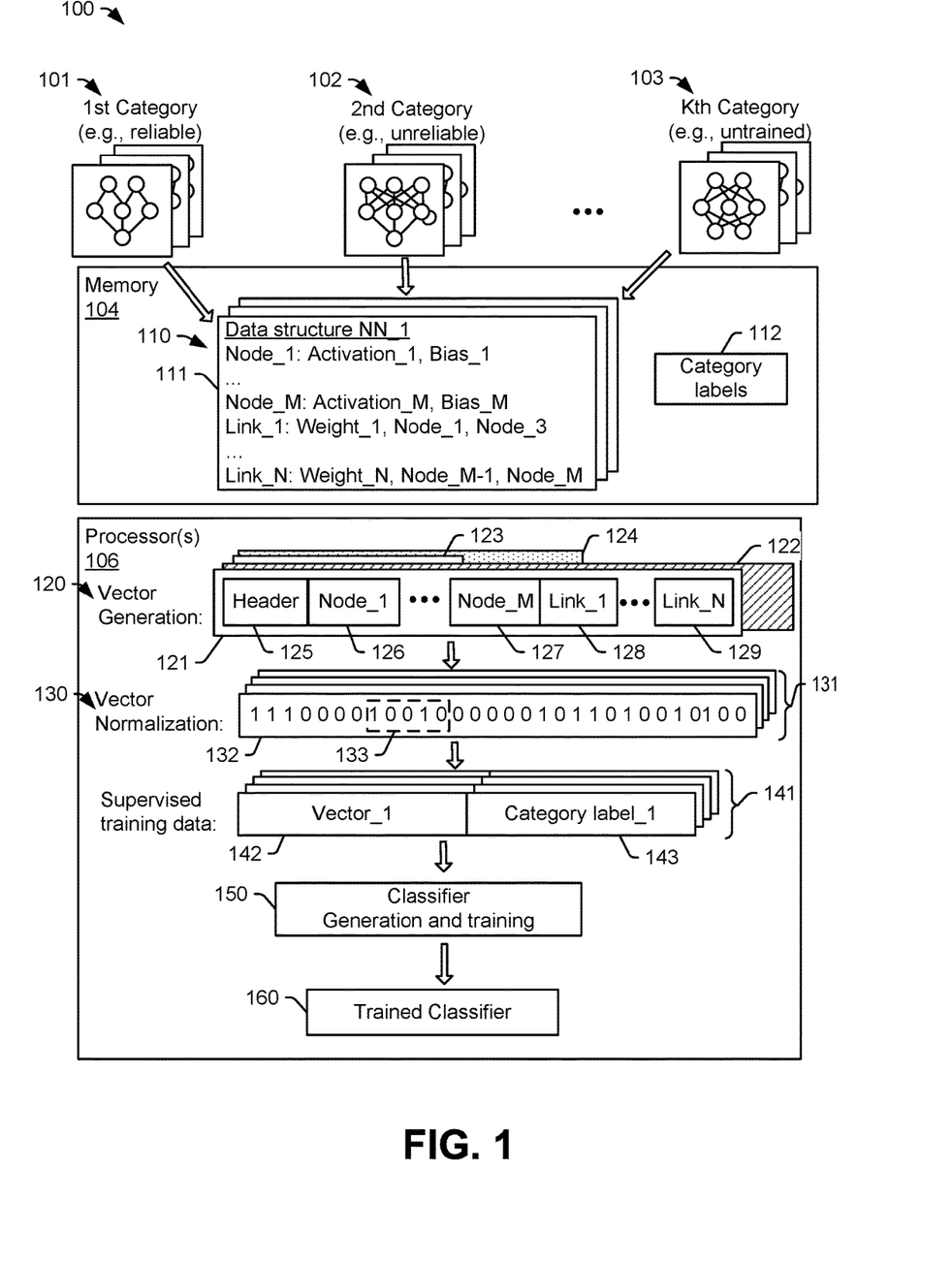
FIG. 1 illustrates a particular example of a computer system that is operable to generate a trained classifier based on supervised training data associated with a set of neural networks.

FIG. 1 illustrates a particular example of a computer system 100 that is operable to generate a trained classifier based on supervised training data associated with a set of neural networks. The computer system 100 includes a memory 104 and one or more processors 106. The memory 104 stores a plurality of data structures 110 representing neural networks, which are logically divided into categories based on category labels. For example, in FIG. 1, each neural network is associated with one of multiple categories, such as a first category 101, a second category 102, and a third category 103. The category associated with each neural network is indicated by a category label (e.g., one of the of category labels 112 stored on the memory 104).

Each data structure 110 includes information describing the topology of a neural network as well as other characteristics of the neural network, such as link weight, bias values, activation functions, and so forth. For example, FIG. 1 illustrates a first data structure 111 of a first neural network identified as neural network 1 (NN_1). The first data structure 111 identifies a plurality of nodes of the neural network, such as a first node (Node_1) through an Mth node (Node_M). In FIG. 1, each node of the neural network is associated with an activation function and a bias value. In some implementations, a particular node may not use a bias value, in which case the bias value may be 0. The first data structure 111 also identifies links between the various nodes, such as a first link (Link_1) through an Nth link (Link_N). Each link is associated with a link weight, as well as information indicating which nodes are connected by the link. In some implementations, nodes are referred to as neurons, and the links are referred to as synapses. The first data structure 111 may include other fields or values in some implementations. For example, the first data structure 111 may include information describing different layers of the neural network rather than specifying the nodes of the neural network.

In a particular implementation, the processors 106 are configured to execute vector generation instructions 120 to generate vector representations of the data structures 110. The vector generation instructions 120 include information to encode or map information in the data structures 110 to fields in vector representations 121-124. For example, in FIG. 1, a particular example of a first vector representation 121 corresponding to the first data structure 111 is shown. The first vector representation 121 includes a plurality of fields which may include values representing particular features of the first data structure 111. As a particular example, the first vector representation 121 includes a first field 126 with one or more values representing the first node (Node_1). In this example, the first field 126 may include a value representing an activation function (Activation_1) of the first node, a value representing a bias function (Bias_1) of the first node, or other characteristics of the node. The values representing the first node in the first field 126 may include string values, floating point values, Boolean values, or values representative of the first data structure 111 based on a particular vector encoding strategy.

In addition to the first field 126 representing the first node (Node_1), the first vector representation 121 includes other fields, such as a second field 127 representing the Mth node (Node_M), a third field 128 representing the first link (Link_1), a fourth field 129 representing an Nth link (Link_N), and so forth. Additionally, the first vector representation 121 may include a header field 125 providing information descriptive of a vector encoding scheme used to generate the first vector representation 121 based on the first data structure 111. For example, the header field 125 may include information indicating a number of nodes present in the first data structure 111 or a number of nodes represented in the first vector representation 121. As another example, the header field 125 may include information indicating a number of links present in the first data structure 111 or a number of links represented by the first vector representation 121. In some implementations, the header field 125 is omitted. For example, rather than including a field that indicates how many nodes are represented in the first vector representation 121, an "end of list" indication may follow a field representing a last node in the first vector representation 121. In this example, a next field after the "end of list" indication is understood to be a field representing a link. Other encoding schemes may omit fields representing nodes, and may instead include fields representing entire layers of a neural network.

The neural networks represented by the data structures 110 may be of different sizes, have different topologies, have different numbers of links and nodes, and so forth. As a result, vectors representing the neural networks may be of different lengths and may have different numbers of or types of fields. For example, in FIG. 1, the first vector representation 121 corresponds to the first data structure 111, a second vector representation 122 corresponds to a second neural network, a third vector representation 123 corresponds to a third neural network, and a fourth vector representation 124 corresponds to a fourth neural network. The first vector representation 121, the second vector representation 122, the third vector representation 123, and the fourth vector representation 124, have different lengths, as illustrated in FIG. 1. The processors 106 may execute vector normalization instructions 130 to conform the vector representations 121-124 into a common format (e.g. length, number of fields, type of fields, or a combination thereof) that can be provided as input to classifier generation and training instructions 150.

The vector normalization instructions 130 may perform operations such as sub-sampling the vector representations 121-124. For example, only a representative set of nodes of each vector representation 121-124, only a representative set of links of each vector representation 121-124, or both, may be used to generate the normalized vectors 131. To illustrate, the representative set of nodes, the representative set of links, or both, may be designated by a vector encoding scheme used to map the vector representations 121-124 to the normalized vectors 131. Alternatively or additionally, the vector normalization instructions 130 may convert values in the fields 125-129 of the first vector representation 121 into Boolean values. The Boolean values may indicate whether particular features are present in a vector representation of a neural network, such as whether the neural network includes more than one hidden layer or whether a particular node uses a bias value or bias function. As another example, the Boolean value may represent whether a particular node uses a particular activation function.

In a particular implementation, the normalized vectors 131 generated by the vector normalization instructions 130 have the same size (e.g., length). Thus, the normalized vectors 131 in FIG. 1 include four normalized vectors having the same size. A first normalized vector 132 in FIG. 1 includes one or more values, such as a field 133 that corresponds to or represents a value associated with a particular node of the first neural network, a particular link of the first neural network, a topology of the first neural network, or other data representing weights or values of the first neural network.

Supervised training data 141 including vectors 142 and the category labels 112 is provided to classifier generation and training instructions 150. The vectors 142 may include or correspond to the normalized vectors 131, the vector representations 121-124, or both. Thus, in some implementations, execution of the vector normalization instructions 130 is optional. The supervised training data includes a corresponding category label for each vector 142. Thus, in FIG. 1, a first of the vectors 132 (e.g., Vector_1) and a first category label (Category label_1) 143 form a first supervised training data input corresponding to the first neural network represented by the first data structure 111. Similarly, other vectors 142 are associated with corresponding category labels to generate the supervised training data 141. The classifier generation and training instructions 150 generate a trained classifier 160 based on the supervised training data 141. The trained classifier 160 may include a decision tree classifier, a support vector machine classifier, a neural network based classifier, or another machine learning data model that is configured to generate a classification result based on input data.

As described above, the neural networks used to generate the supervised training data represent a variety of different categories 101-103. Accordingly, the trained classifier 160 can be configured to generate classification results classifying an unknown (e.g., unlabeled) neural network in any of these categories 101-103. As an example, the first category label 143 corresponding to the first data structure 111 may indicate that the first neural network has historically been reliable, has historically been unreliable, has acceptable performance (relative to a performance criterion), has unacceptable performance (relative to the performance criterion), or is an untrained neural network. In this example, the trained classifier 160 may be configured to generate a classification result indicating that an unknown neural network is expected to be reliable, is expected to be unreliable, or is untrained. As another example, the first category label 143 may indicate that the first neural network is a classifier neural network, is a regression neural network, or is a reinforcement learning neural network. In this example, the trained classifier 160 may be configured to generate a classification result indicating that an unknown neural network is a classifier neural network, a regression neural network, or a reinforcement learning neural network.

As yet another example, the first category label 143 associated with the first neural network may indicate that the first neural network is associated with a particular type of data, such as image data, sound data, text data, sensor data, and so forth. In this example, the trained classifier 160 may be configured to generate a classification result indicating a particular type of data with which an unknown neural network is associated. Further, the above examples are not exhaustive or mutually exclusive. For example, the trained classifier 160 may be configured to generate a classification result indicating whether an unknown neural network is expected to be reliable, whether the unknown neural network is sufficiently trained, a type of data with which the unknown neural network is associated, a type of analysis performed by the unknown neural network (e.g., classification, regression, reinforcement learning, etc.), expected performance of the unknown neural network, or a combination thereof.

Accordingly, in some implementations, the trained classifier 160 may provide a user (or a computer system) with a level of confidence in reliability of a new or unknown neural network. Further, the trained classifier 160 may enable the user (or computer system) to discard, cease using, or further train a new or unknown neural network based on a classification result indicating that the neural network is not expected to be reliable or is not sufficiently trained.

Figure 2:
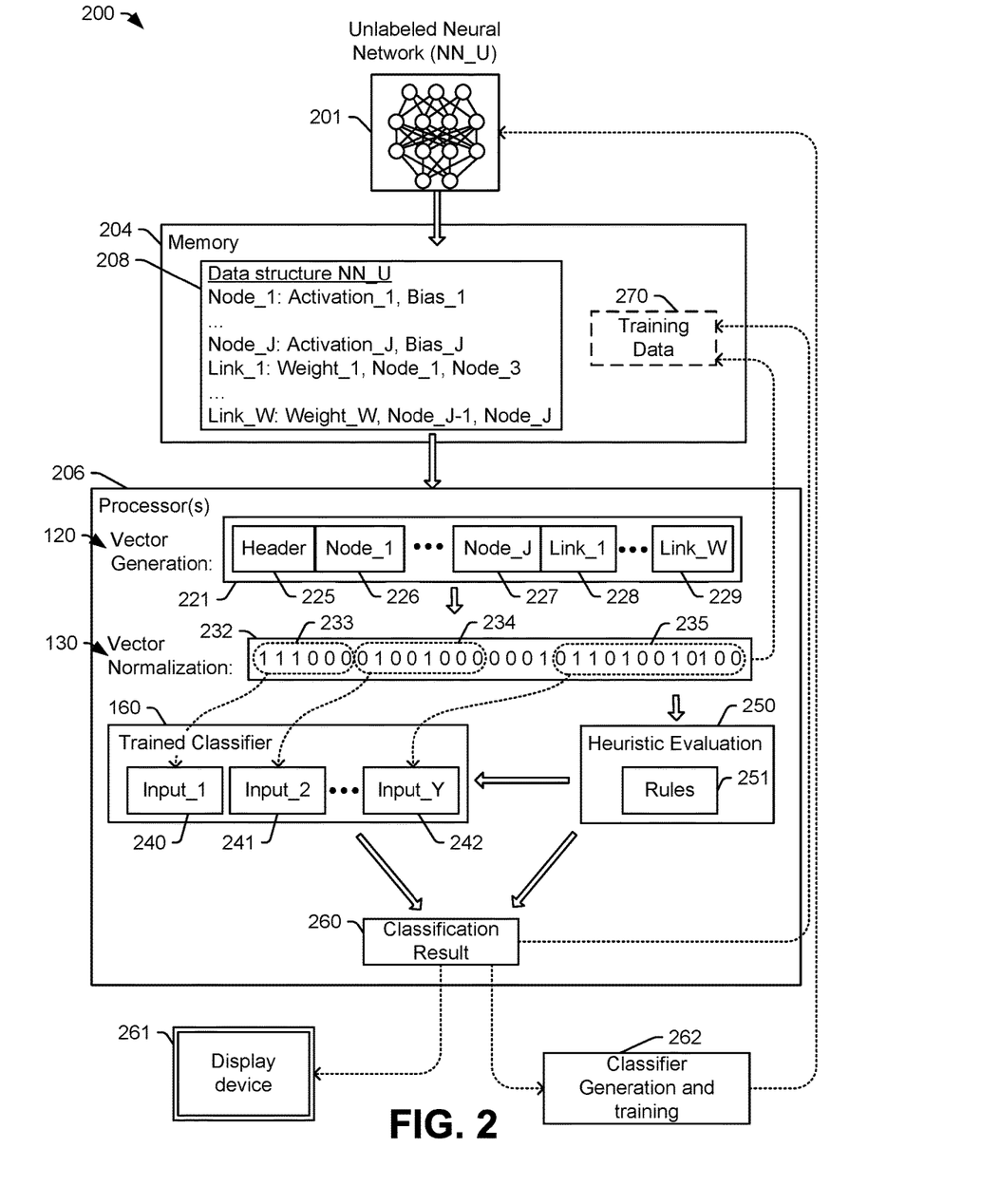
FIG. 2 illustrates a particular example of a computer system that is operable to use the trained classifier of FIG. 1 to evaluate an unknown or unlabeled neural network.

FIG. 2 illustrates a particular example of a computer system 200 that is operable to use the trained classifier 160 of FIG. 1 to evaluate an unknown or unlabeled neural network. In FIG. 2, an unlabeled neural network (NN_U) 201 is provided as input to the trained classifier 160 to generate a classification result 260 indicating whether the unlabeled neural network 201 is expected to be reliable. Depending on the classification result 260, the computer system 200 may initiate further actions, such as training or regenerating the unlabeled neural network 201 or storing training data 270 based on the classification result 260. For example, the classification result 260 and a vector representing the unlabeled neural network (e.g., the normalized vector 232) may be stored as a training data entry in the training data 270. In this example, the training data 270 may also include training data entries associated with one or more other neural networks (e.g., based on other classification results generated by the trained classifier 160 or provided from other sources). For example, the training data 270 may include the supervised training data 141 of FIG. 1 as well as other training data entries associated with other neural networks that are independent of and unrelated to the unlabeled neural network 201. The training data 270 may include entries associated with various types of neural networks, such as a first training data entry associated with a classifier neural network and a second training data entry associated with a regression neural network. The training data 270 may also include training data entries associated with neural networks associated with different types of data. The training data 270 may be used to update the trained classifier 160. The classification result 260 may also be displayed to a user to increase user confidence in the unlabeled neural network 201.

The computer system 200 includes a memory 204 and one or more processors 206. In some implementations, the computer system 200 includes or corresponds to the computer system 100 of FIG. 1. For example, the memory 204 may include or correspond to the memory 104, and the one or more processors 206 may include or correspond to the one or more processors 106. In other implementations, the computer system 200 is distinct from the computer systems 100. For example, the computer system 100 may generate the trained classifier 160 and may distribute the trained classifier 160 to one or more other devices, such as one or more server or client computer systems (including the computer system 200) that use the trained classifier 160 to evaluate unlabeled or unknown neural networks.

The unlabeled neural network 201 is represented in the memory 204 by a data structure 208. As described above, the data structure 208 may include information describing one or more nodes of the unlabeled neural network 201, one or more links between nodes of the unlabeled neural network 201, and so forth. In the example illustrated in FIG. 2, the data structure 208 identifies characteristics of a first node (Node_1), such as an activation function (Activation_1) of the first node and a bias function (Bias_1) of the first node. The data structure 208 also identifies characteristics of one or more additional nodes, including a Jth node (Node_J). Additionally, the data structure 208 identifies links between nodes of the unlabeled neural network 201 and weights associated with each link. In other examples, the data structure 208 may include additional information or different information, such as layer representation of the unlabeled neural network 201.

The processors 206 may access the data structure 208 and provide the data structure 208 as input to the vector generation instructions 120. The vector generation instructions 120 may generate a vector representation 221 of the data structure 208. In FIG. 2, the vector representation 221 includes a header field 225, multiple node fields 226 and 227, and multiple link fields 228 and 229. As described with respect to FIG. 1 in other implementations, the vector representation 221 may include other information, such as a field representing a layer of the unlabeled neural network 201.

The processors 206 may provide the vector representation 221 of the unlabeled neural network 201 as input to the vector normalization instructions 130. The vector normalization instructions 130 may generate a normalized vector 232 representing the unlabeled neural network 201 based on the data structure 208 and the vector representation 221. The vector normalization instructions 130 operate as described with respect to FIG. 1.

In some implementations, the trained classifier 160 includes a sequence or set of input nodes, such as input nodes 240, 241, and 242, that are associated with particular portions of the normalized vector 232. For example, the first input node 240 may correspond to a first field or set of fields 233 of the normalized vector 232, the second input node 241 may correspond to a second field or set of fields 234 of the normalized vector 232, and a Yth input node 242 may correspond to a Yth field or set of fields 235 of the normalized vector 232. The fields 233-235 are arranged in a manner that corresponds to or is based on (e.g., is mapped to) the sequence of input nodes 240-242. The processors 206 executing the trained classifier 160 may provide a vector representing the unlabeled neural network 201 (e.g., the normalized vector 232, the vector representation 221, or both) as input to the input nodes to generate the classification result 260. The classification result indicates a particular category (e.g., one of the categories 101-103 of FIG. 1) with which the unlabeled neural network 201 is associated.

The processor 206 may execute heuristic evaluation instructions 250 to evaluate the vector representing the unlabeled neural network 201 using one or more rules 251. For example, the heuristic evaluation instructions 250 may compare patterns identified by the rules 251 to the normalized vector 232 to determine whether the normalized vector 232 matches one or more of the patterns. In a particular implementation, the patterns are associated with or characteristic of unreliable neural networks. In this implementation, when the normalized vector 232 satisfies (e.g., matches within a threshold) one of the patterns, the heuristic evaluation instructions 250, independently of the trained classifier 160, generate a classification result 260 indicating that the unlabeled neural network 201 is expected to be unreliable.

In some implementation, the heuristic evaluation instructions 250 compare the vector representing the unlabeled neural network 201 to other vectors from the training data 270. For example, the training data 270 may include labeled normalized vectors as in the supervised training data 141 of FIG. 1, and the heuristic evaluation instruction 250 may generate a distance metric indicating a distance between the normalized vector 232 and each of one or more normalized vectors in the training data 270. To illustrate, a distance metric may be calculated between the normalized vector 232 and the normalized vector 132 of FIG. 1. As a first example, the normalized vector 132 of FIG. 1 may be associated with a first category label 143 that indicates that a neural network represented by the normalized vector 132 is expected to be reliable, and a distance between the normalized vector 132 and the normalized vector 232 of FIG. 2 may be small (e.g., less than a threshold). In this example, the heuristic evaluation instructions 250 may indicate, based on the rules 251 and the distance metric, that the unlabeled neural network 201 is expected to be reliable. As a second example, the normalized vector 132 of FIG. 1 may be associated with a first category label 143 that indicates that a neural network represented by the normalized vector 132 is expected to be unreliable and a distance between the normalized vector 132 and the normalized vector 232 of FIG. 2 is small (e.g., less than a threshold), the heuristic evaluation instructions 250 may indicate, based on the rules 251 and the distance metric, that the unlabeled neural network 201 is expected to be unreliable.

In a particular implementation, the processors 206 execute the heuristic evaluation instructions 250 and the trained classifier 160 concurrently. For example, the classification result 260 may be based on both the heuristic evaluation instructions 250 and the trained classifier 160. In this example, results of evaluation by the heuristic evaluation instructions 250 may be used to confirm or disconfirm the classification result 260 generated by the trained classifier 160. In another implementation, the heuristic evaluation instructions 250 are used to evaluate the vector representing the unlabeled neural network 201 before the vector is input to the trained classifier 160. In this implementation, the vector is input to the trained classifier 160 based on the heuristic evaluation instructions 250 indicating no issues with the vector.

The processors 206 may generate output based on the classification result 260. For example, the processor 206 may send the output to a display device 261 to indicate that the unlabeled neural network 201 is expected to be reliable, is expected to be unreliable, is expected to have performance that satisfies a performance criterion, or falls into another category as previously described. As another example, the classification result 260 may be used to generate an entry in the training data 270. In this example, the training data entry based on the classification result 260 may be used to updating or further train the trained classifier 160. To illustrate, if the classification result 260 generated by the heuristic evaluation instructions 250 and the classification result 260 generated by the trained classifier 160 are identical (such as both indicating that the unlabeled neural network 201 is expected to be an unreliable), the classification result 260 (or a label indicating the classification result 260) may be stored in the training data 270 to further train the trained classifier 160 or to train a subsequent generation of the trained classifier 160.

As yet another example, when the classification result 260 indicates that the unlabeled neural network 201 is untrained or is insufficiently trained, the processors 206 may initiate training (or further training) of the neural network 201 by sending a signal to cause classifier generation and training instructions 262 to train the unlabeled neural network 201 via back propagation or another optimization process. After further training by the classifier generation and training instructions 262, the unlabeled neural network 201 may again be evaluated to generate a subsequent classification result 260.

Although FIG. 2 illustrates evaluation of a single unlabeled neural network 201, in other implementations, multiple unlabeled neural network may be evaluated concurrently or sequentially, and classification results of the multiple unlabeled neural networks may be used for further processing. For example, the classifier generation and training instructions 262 may be executed to generate and train two or more neural networks having different topologies. After training the two or more neural networks, an estimated accuracy of each neural network (based on an error function used for the optimization process) may be output by the classifier generation and training instructions 262. The two or more neural networks may subsequently be evaluated using the trained classifier 160, as described above, to generate a classification result for each neural network. In this example, the estimated accuracy based on the error function and the classification result for each neural network may be used to select for use a single neural network from among of the two or more neural networks. For example, a first neural network of the two or more neural networks may have a first error value based on the supervised training data used to train the two or more neural networks, and a second neural network of the two or more neural networks may have a second error value based on the supervised training data used to train the two or more neural networks. Intuitively, the neural network having the lowest error value may seem preferable for use. For example, if the first error value is lower than the second error value, it may be intuitively appealing to use the first neural network. However, if the classification result associated with the first neural network indicates that the first neural network is not expected to be reliable, the second neural network may be selected for use because the relative low first error value is based only on the set of supervised training data used to train the first neural network, whereas the classification result is based on a wider set of consideration, which may not be apparent from evaluating only the supervised training data used to train the first neural network.

Figure 3:
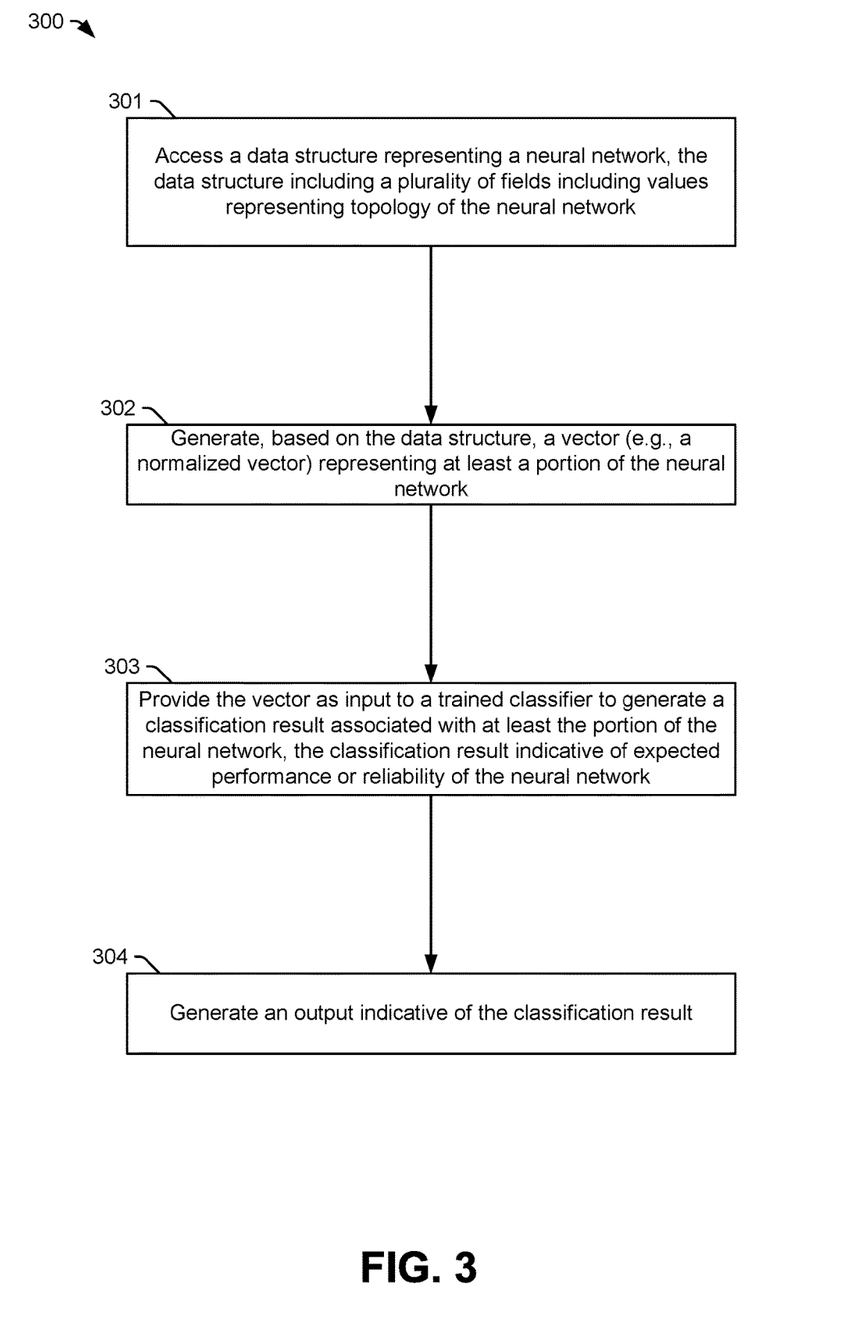
FIG. 3 is a flowchart illustrating a particular example of a method of evaluating an unknown or unlabeled neural network using the trained classifier of FIG. 1.

FIG. 3 is a flowchart illustrating a particular example of a method 300 of evaluating an unknown or unlabeled neural network using the trained classifier 160 of FIGS. 1 and 2. The method 300 may be performed by the computer system 200 of FIG. 2.

The method 300 includes, at 301, accessing a data structure representing a neural network, where the data structure includes a plurality of fields including values representing a topology of the neural network. For example, the plurality of fields may include one or more fields descriptive of a first node of the neural network, a second node of the neural network, and a link between the first node and second node. To illustrate, the processors 206 of FIG. 2 may access the data structure 208 from the memory 204, where the data structure 208 include fields representing the unlabeled neural network 201.

The method 300 also includes, at 302, generating, based on the data structure, a vector (e.g., a feature vector or a normalized vector) representing at least a portion of the neural network. For example, the processors 206 of FIG. 2 may execute the vector generation instructions 120 to generate the vector representation 221, which represents at least a portion of the data structure 208. The processors 206 may provide the vector representation 221 as input to the vector normalization instructions 130. The vector normalization instructions 130 may generate the normalized vector 232, which represents at least a portion of the data structure 208.

The method 300 further includes, at 303, providing the vector as input to a trained classifier to generate a classification result associated with at least the portion of the neural network, the classification result indicative of expected performance or reliability of the neural network. For example, the processors 206 may provide the normalized vector 232 as input to the trained classifier 160 to generate the classification result 260.

The method 300 also include, at 304, generating an output indicative of the classification result. For example, the processors 206 may send a signal to the display device 261 indicating the classification result 260. Additionally or in the alternative, the processors 206 may send a signal to the classifier generation and training instructions 262 to cause the neural network to be further trained. Additionally or in the alternative, the classification result 260 may be used to generate a training data entry in the training data 270. The training data entry may be used to update or further train the trained classifier.

The systems and methods illustrated herein may be described in terms of functional block components, screen shots, optional selections and various processing steps. It should be appreciated that such functional blocks may be realized by any number of hardware and/or software components configured to perform the specified functions. For example, a system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Methods disclose herein may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system comprising:
   a memory storing a data structure representing a neural network, the data structure including a plurality of fields including values representing topology of the neural network, the plurality of fields descriptive of a first node of the neural network, a second node of the neural network, and a link between the first node and second node; and
   one or more processors configured to perform neural network classification by operations including:
   generating, based on the data structure, a vector representing at least a portion of the neural network;
   providing the vector as input to a trained classifier to generate a classification result associated with at least the portion of the neural network, the classification result indicative of expected performance or expected accuracy of the neural network;

generating an output indicative of the classification result;
generating an updated trained classifier based on a training data entry associated with the classification result; and
providing a second vector as input to the updated trained classifier to generate a second classification result associated with at least a portion of a second neural network, the second classification result indicative of expected performance or expected accuracy of the second neural network.

2. The computer system of claim 1, wherein the operations further include storing the classification result and the vector as the training data entry in the memory.

3. The computer system of claim 1, wherein generating the vector comprises:
identifying whether the neural network includes each feature of a plurality of features;
generating a plurality of values, each value of the plurality of values identifying whether a particular feature of the plurality of features is included in the neural network; and
combining the plurality of values to generate the vector.

4. The computer system of claim 3, wherein a data length of the vector is independent of whether the plurality of features are included in the neural network.

5. The computer system of claim 1, wherein the updated trained classifier is further based on training data entries associated with one or more other neural networks include first training data associated with a first neural network that is configured to analyze a first type of data and second training data associated with a second neural network that is configured to analyze a second type of data, wherein the first type of data is different from the second type of data.

6. The computer system of claim 1, wherein the operations further include initiating training of the neural network in response to the classification result classifying the neural network as inaccurate.

7. The computer system of claim 1, wherein the operations further include evaluating the vector using one or more heuristic rules, wherein the vector is provided as input to the trained classifier based on a determination that the vector satisfies the one or more heuristic rules.

8. The computer system of claim 1, wherein the classification result is further indicative of a particular type of data with which the neural network is associated.

9. The computer system of claim 1, wherein the classification result is independent of a type of data that the neural network is configured to operate on and independent of a type of result the neural network is configured to produce.

10. A method comprising:
accessing, by a processor, a data structure representing a neural network, the data structure including a plurality of fields including values representing topology of the neural network, the plurality of fields descriptive of a first node of the neural network, a second node of the neural network, and a link between the first node and second node;
generating, by the processor based on the data structure, a vector representing at least a portion of the neural network;
providing, by the processor, the vector as input to a trained classifier to generate a classification result associated with at least the portion of the neural network, the classification result indicative of expected performance or expected accuracy of the neural network;
generating, by the processor, an output indicative of the classification result;
generating an updated trained classifier based on a training data entry associated with the classification result; and
providing a second vector as input to the updated trained classifier to generate a second classification result associated with at least a portion of a second neural network, the second classification result indicative of expected performance or expected accuracy of the second neural network.

11. The method of claim 10, further comprising generating, by the processor based on the data structure, a vector representation of at least the portion of the neural network, wherein the vector is generated based on the vector representation of at least the portion of the neural network.

12. The method of claim 10, wherein the vector is a normalized vector including a set of values arranged based on a sequence of input nodes of the trained classifier.

13. The method of claim 10, wherein the vector includes one or more values indicating a topology of the neural network.

14. The method of claim 10, wherein the classification result indicates whether the neural network has been trained.

15. The method of claim 10, wherein the classification result includes an accuracy classification.

16. The method of claim 15, further comprising sending a signal to cause the neural network to be trained in response to the accuracy classification classifying the neural network as inaccurate.

17. The method of claim 10, further comprising, before providing the vector as input to the trained classifier, evaluating the vector using one or more heuristic rules, wherein the vector is provided as input to the trained classifier based on a determination that the vector satisfies the one or more heuristic rules.

18. The method of claim 17, wherein the one or more heuristic rules specify patterns in vectors of neural networks that are not expected to provide accurate results.

19. The method of claim 18, wherein a particular pattern of the patterns includes a sequence of repeating values.

20. The method of claim 10, wherein the trained classifier includes a decision tree, a support vector machine, or a third neural network.

21. A computer-readable storage device storing instructions that are executable by a processor to cause a computer system to perform operations comprising:
accessing a data structure representing a neural network, the data structure including a plurality of fields including values representing topology of the neural network, the plurality of fields descriptive of a first node of the neural network, a second node of the neural network, and a link between the first node and second node;
generating, based on the data structure, a vector representing at least a portion of the neural network;
providing the vector as input to a trained classifier to generate a classification result associated with at least the portion of the neural network, the classification result indicative of expected performance or expected accuracy of the neural network;
generating an output indicative of the classification result; and
initiating training of the neural network in response to the classification result.

22. The computer-readable storage device of claim 21, wherein the operations further comprise, generating the trained classifier based on training data entries associated with one or more other neural networks that are independent of and unrelated to the neural network.

23. The computer-readable storage device of claim 21, wherein:
- the expected performance of the neural network is based at least in part on a number of layers in the neural network, a processing time of the neural network, a parallelizability of the neural network, whether the neural network satisfies a formal specification of behavior, or any combination thereof; and
- the expected accuracy of the neural network is based at least in part on a robustness of the neural network to a range of input values; an ability of the neural network to generate a result within a threshold of an expected confidence value, or a combination thereof.

* * * * *